United States Patent
Massand et al.

(10) Patent No.: US 11,641,108 B2
(45) Date of Patent: May 2, 2023

(54) SYSTEMS, APPARATUS, AND METHODS FOR POWER MANAGEMENT

(71) Applicant: D&R Tech LLC, McLeansville, NC (US)

(72) Inventors: Deepak Massand, McLeansville, NC (US); Rajan Jetley, New Delhi (IN)

(73) Assignee: D&R Tech LLC, McLeansville, NC (US)

( * ) Notice: Subject to any disclaimer, the term of this patent is extended or adjusted under 35 U.S.C. 154(b) by 0 days.

(21) Appl. No.: 17/581,056

(22) Filed: Jan. 21, 2022

(65) Prior Publication Data
US 2022/0382354 A1    Dec. 1, 2022

Related U.S. Application Data

(63) Continuation of application No. 16/817,521, filed on Mar. 12, 2020, now Pat. No. 11,258,269, which is a
(Continued)

(51) Int. Cl.
*H02J 3/14*    (2006.01)
*H02J 9/00*    (2006.01)
(Continued)

(52) U.S. Cl.
CPC .............. *H02J 3/14* (2013.01); *G06F 1/3206* (2013.01); *H02J 5/00* (2013.01); *H02J 9/005* (2013.01);
(Continued)

(58) Field of Classification Search
CPC ...... H02J 3/14; H02J 5/00; H02J 9/005; H02J 9/00; G06F 1/3206; Y02B 70/30; Y02B 70/3225; Y04S 20/20; Y04S 20/222
See application file for complete search history.

(56) References Cited

U.S. PATENT DOCUMENTS

| 4,106,013 A | 8/1978 | Cronin |
| 5,414,475 A | 5/1995 | Trzyna |

(Continued)

FOREIGN PATENT DOCUMENTS

| CN | 1237283 | 12/1999 |
| CN | 1012611534 | 9/2008 |

(Continued)

OTHER PUBLICATIONS

ISR/WO, PCT/US2012/027861.
(Continued)

*Primary Examiner* — Robert L Deberadinis

(57) ABSTRACT

Systems, apparatus, and methods for controlling power modes in electronic devices are provided. A system may include an electronic device and an input device that sends power mode selection information via a network to a power mode selection receiving component in the electronic device. The electronic device includes a first power component that powers a first component, and a switching component that controls the first power component. The electronic device may include a second power component that powers a second component. The switching component may control the second power component. The power mode selection receiving component and the switching component may be powered independently of the first and the second component. If the power mode selection information indicates an off mode, the electronic device may provide power to the power mode selection receiving component and the switching component and not to the first and the second component.

20 Claims, 6 Drawing Sheets

Related U.S. Application Data continuation of application No. 15/858,161, filed on Dec. 29, 2017, now Pat. No. 10,594,140, which is a continuation of application No. 15/090,444, filed on Apr. 4, 2016, now Pat. No. 9,859,717, which is a continuation of application No. 13/412,683, filed on Mar. 6, 2012, now Pat. No. 9,306,416.

(60) Provisional application No. 61/450,814, filed on Mar. 9, 2011.

(51) Int. Cl.
  *G06F 1/3206* (2019.01)
  *H02J 5/00* (2016.01)

(52) U.S. Cl.
  CPC ........... *Y02B 70/30* (2013.01); *Y02B 70/3225* (2013.01); *Y04S 20/20* (2013.01); *Y04S 20/222* (2013.01)

(56) References Cited

U.S. PATENT DOCUMENTS

| | | | |
|---|---|---|---|
| 6,414,864 | B1 | 7/2002 | Hoshi |
| 6,608,476 | B1 | 8/2003 | Mirov |
| 7,702,733 | B2 | 4/2010 | Fleck |
| 8,151,128 | B2 | 4/2012 | Qu |
| 9,306,416 | B2 | 4/2016 | Massand |
| 9,858,717 | B2 | 1/2018 | Massand |
| 10,594,140 | B2 | 3/2020 | Massand |
| 2002/0036910 | A1 | 3/2002 | Yang |
| 2006/0098958 | A1 | 5/2006 | Ohmori |
| 2006/0142874 | A1 | 6/2006 | Pettigrew |
| 2006/0285024 | A1 | 12/2006 | Chou |
| 2007/0202932 | A1 | 8/2007 | Keller |
| 2007/0279951 | A1 | 12/2007 | Wu |
| 2008/0052740 | A1 | 2/2008 | Sakai |
| 2008/0276257 | A1 | 11/2008 | Fuchs |
| 2009/0041438 | A1 | 2/2009 | Kuno |
| 2010/0306558 | A1 | 12/2010 | Kang |
| 2010/0315845 | A1 | 12/2010 | Kotani |
| 2011/0138200 | A1 | 6/2011 | Tomizawa |
| 2011/0138206 | A1 | 6/2011 | Garcia-Tobin |

FOREIGN PATENT DOCUMENTS

| | | |
|---|---|---|
| CN | 101715625 | 5/2010 |
| CN | 101855607 | 10/2010 |
| CN | 101924477 | 12/2010 |
| DE | 19545659 | 6/1997 |
| EP | 1610543 | 12/2005 |
| EP | 1783887 | 9/2007 |
| EP | 2051379 | 4/2009 |
| JP | H07212678 A | 8/1995 |
| JP | 2002359705 | 12/2002 |
| JP | 2004193825 A | 7/2004 |
| JP | 2005218162 | 8/2005 |
| JP | 2007135354 A | 5/2007 |
| JP | 2007214949 | 8/2007 |
| JP | 2007214983 | 8/2007 |
| JP | 2008054085 | 3/2008 |
| JP | 2009088737 | 4/2009 |
| JP | 2010140241 | 6/2010 |
| KR | 20120008935 | 2/2012 |
| WO | WO2010003785 | 1/2010 |
| WO | WO2011133119 | 10/2011 |

OTHER PUBLICATIONS

First office action in related Chinese patent application, No. 2012800223827, dated May 15, 2015.
Second office action in related Chinese patent application, No. 2012800223827, dated Feb. 14, 2016.
Office action in related Japanese patent application, No. 2013557803, dated Apr. 4, 2016.
Office action in related Japanese patent application, No. 2013557803, dated Oct. 18, 2016.
Third office action in related Chinese patent application, No. 2012800223827, dated Aug. 11, 2016.
Office action from corresponding Chinese patent application, No. 201810188668.7, dated Aug. 12, 2019 (7 pages).
Office Action in corresponding Japanese Application No. 2019128647, dated Sep. 23, 2020 (9 pages).

SYSTEMS, APPARATUS, AND METHODS FOR POWER MANAGEMENT

This application is a continuation of U.S. Utility patent application Ser. No. 16/817,521, filed on Mar. 12, 2020, which in turn is a continuation of U.S. Utility patent application Ser. No. 15/858,161, filed on Dec. 29, 2017 (now U.S. patent Ser. No. 10/594,140), which in turn is a continuation of U.S. Utility patent application Ser. No. 15/090,444 (now U.S. Pat. No. 9,858,717), which in turn is a continuation of U.S. Utility patent application Ser. No. 13/412,683 (now U.S. Pat. No. 9,306,416), which in turn claims priority to U.S. Provisional Application No. 61/450,814, filed on Mar. 9, 2011, the disclosure of which is incorporated herein by reference in its entirety.

TECHNICAL FIELD

Disclosed embodiments relate generally to power management for electronic devices. More specifically, disclosed embodiments relate to reducing power consumption in remote-controlled electronic devices.

BACKGROUND

Recently, the cost of energy has risen and the environmental impact of energy consumption has become better understood. As a result, it is desirable to reduce energy consumption in order to save money and protect the environment. However, conventional electronic devices, including, e.g., digital devices such as amplifiers, radios, televisions, audio/video receivers, video cassette recorders (VCRs), digital versatile disc (DVD) players, digital video recorders (DVRs), game consoles, etc., consume energy even when they are powered "off."

For example, when conventional electronic devices are powered off, specific components in the devices remain powered on and therefore continue to consume energy and draw power from a power source, such as an outlet. The conventional electronic devices may keep these components powered on in order to ensure that the device may quickly respond to a user powering on the device, for example, by pressing a power button on the device or on a remote control. For instance, remote control sensors in conventional electronic devices are often integrated into a circuit that provides power to specific components when the device is powered off, and thus allow the specific components to draw power while the device is in a power-off mode.

This setup in conventional electronic devices has a dramatic effect on energy consumption. For example, because both the specific components and the remote control sensor continue to draw power even when the device is powered off, the conventional electronic devices tend to consume approximately 45% of their rated energy consumption while powered off, wasting a large amount of energy.

SUMMARY

Systems and methods consistent with disclosed embodiments may provide a first power component capable of providing power to a first component and a second power component capable of providing power to a second component. A power mode selection receiving component may be capable of receiving an indication of a selected power mode. A switching component may control the two power components based on the received selected power mode. The power mode selection receiving component and the switching component may be powered independently of the first and second power components, so that in an off power mode power is blocked from the main component and the standby component, while the power mode selection receiving component and the switching component receive power.

In some embodiments, an input such as a remote control provides a user with three choices for managing the power of the electronic device. A first choice may be an on mode. In response to the user's choice of an on mode, the switching component may control the power components to provide power to both the main and standby component. A second choice may be a standby mode. In a standby mode, the switching component may control the power components to provide power to the standby component and block power from the main component. A third choice may be an off mode. In an off mode, the switching component may control the power components so that power is blocked from both the main component and the standby component. In all three modes, power is supplied independently to the power mode selection receiving component and the switching component.

Additional objects and advantages of disclosed embodiments will be set forth in part in the description which follows, and in part will be apparent from the description, or may be learned by practice of the disclosed embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and together with the description, serve to explain the principles of the embodiments. In the drawings.

DESCRIPTION OF THE EMBODIMENTS

Disclosed embodiments may provide a capability for reducing almost all power consumed by an electronic device when powered off. Systems and methods consistent with disclosed embodiments provide power to a power mode selection receiving component, e.g., a sensor that receives a command from an input device. The power mode selection receiving component receives the command independently of other components in the electronic device, allowing one or more of the other components to receive no power while the power mode selection receiving component receives power. Reference will now be made in detail to exemplary embodiments, examples of which are illustrated in the accompanying drawings. Wherever possible, the same reference numbers will be used throughout the drawings to refer to the same or like parts.

Figure 1:
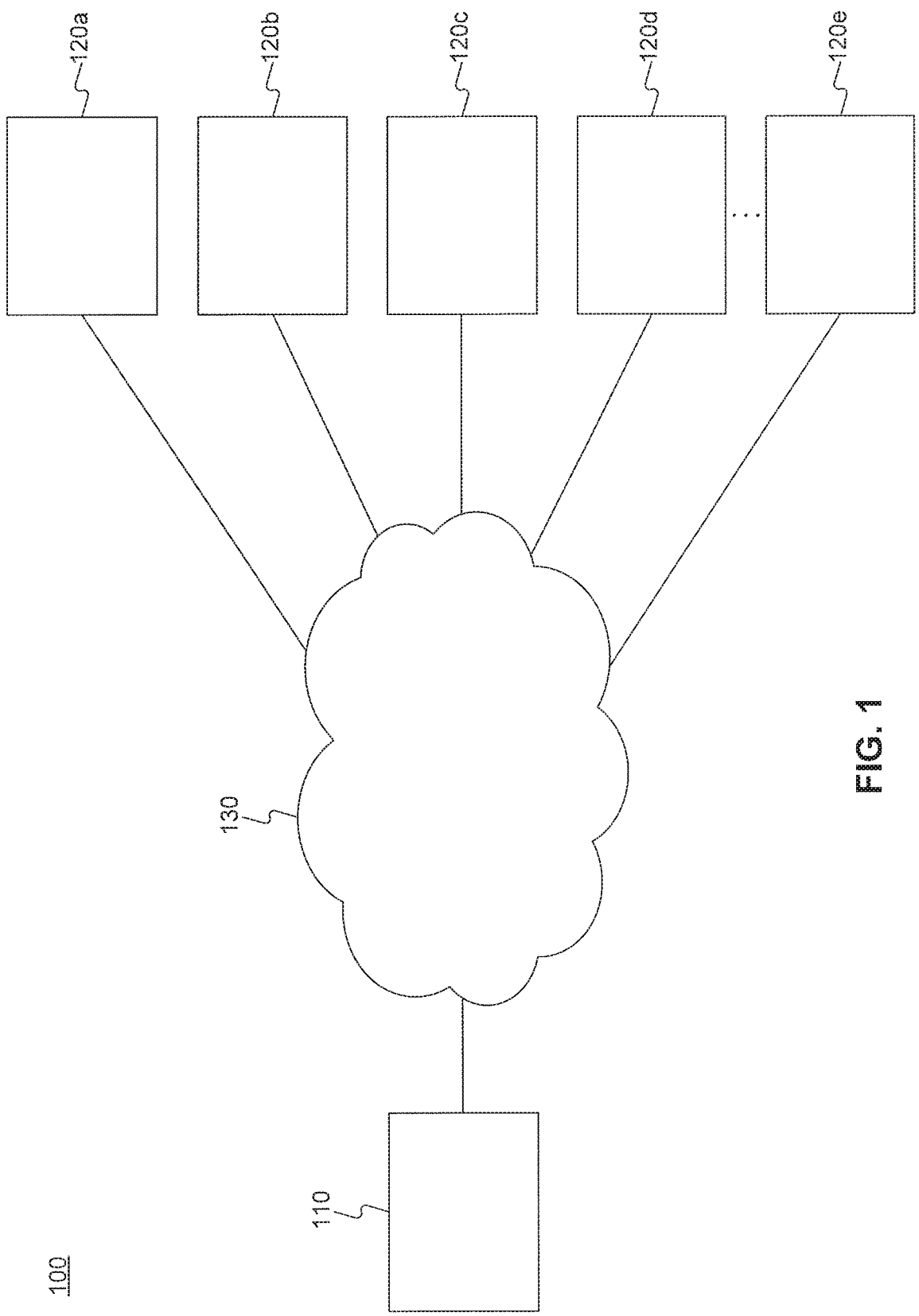
FIG. 1 is an exemplary diagram of an electronic system consistent with disclosed embodiments.

FIG. 1 is a diagram of an electronic system 100 consistent with disclosed embodiments. Electronic system 100 may include input device 110 connected to one or more electronic devices 120 via network 130. Input device 110 may communicate with one or more of the electronic devices 120 via network 130 to change various settings on electronic devices 120, such as power settings, for example.

In some embodiments, electronic system 100 may be a home entertainment system. In this example, electronic devices 120a, 120b, 120c, 120d, and 120e may be a television, an audio/visual receiver, a DVD player, a VCR, and a DVR, respectively. In one embodiment, other types of electronic devices may be implemented in system 100 such as set top boxes, video game consoles, music playback devices, etc. Input device 110 may communicate with electronic devices 120 via network 130, allowing a user to interact with the electronic devices 120. For example, in some embodiments, input device 110 may allow a user to choose a current power mode for each of the electronic devices 120. The power modes may include an on mode, a standby mode, and an off mode, for example.

When a device is in an on mode, the device may be functional from the standpoint of the user. For example, in an on mode, most or all of the components in the device may receive power. When a device is in a standby mode, the device may not be functional from the standpoint of the user, but some of the components in the device may receive power so that the device can become functional quickly in response to a user switching the device into the on mode. For example, in a standby mode, the device may power a subset of its components, but may not supply power to other components. When a device is in an off mode, the device may not be functional from the standpoint of the user. Further, in an off mode, the device may supply power to a smaller subset of components than are powered in the standby mode. For example, in one embodiment, in the off mode, the device may only provide power to the components necessary to receive an input from input device 110.

Electronic devices 120 may each have various components (not shown). In some embodiments, these components may be divided into two or more groups. For example, in certain embodiments, electronic devices 120 may each have one or more main components and one or more standby components. Main components may include electronic components that can be powered on and off relatively quickly, while standby components may include electronic components that take a longer time to become operational after they are powered on. For example, standby components may include bootable electronic devices that require additional time to boot before becoming operational. As discussed in greater detail below, the main components may receive power in an on mode, but may riot receive power in either an off or standby mode. Likewise, the standby components may receive power in an on and a standby mode, but may not receive power in an off mode.

Network 130 may include any one of or combination of wired or wireless communication mechanisms. For example, network 130 may include a wireless network such as infrared (IR), radio frequency (RF), microwave, cellular and/or wireless network employing, for example, Bluetooth or IEEE 802.11 protocols. Likewise, network 130 may include a wired network such as twisted pair wire, coaxial cable, optical fiber, and/or a digital network. Additionally, network 130 may be integrated into any local area network, wide area network, campus area network, or the Internet and may allow for communication between input device 110 and electronic devices 120 when input device 110 is in a different location than electronic devices 120.

While one input device 110 is shown in FIG. 1, system 100 may use any number of input devices 110. For example, in some embodiments, one input device 110 may control multiple electronic devices 120. In other embodiments input device 110 may control a single electronic device 120, such as electronic device 120a, for example. Similarly, while FIG. 1 shows five electronic devices 120a-120e, system 100 may include any number of electronic devices.

Similarly, input device 110 may be any type of device that a user may use to send an input to one or more of the electronic devices 120. For example, in some embodiments, input device 110 may be a remote control that allows a user to communicate wirelessly with electronic devices 120. However, input device 110 is not limited to a remote control and may include, e.g., a keyboard, mouse, personal computer, cellular telephone, smart phone, personal digital assistant, tablet, an input for receiving voice commands, a video game console controller, etc.

Figure 2:
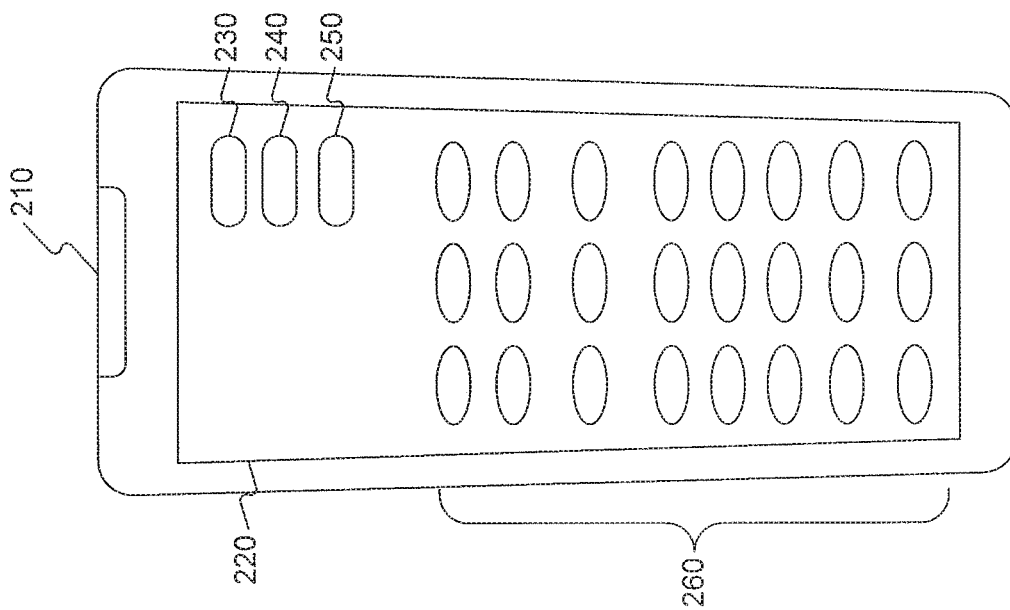
FIG. 2 is an exemplary embodiment of an input device, consistent with disclosed embodiments.

FIG. 2 is an exemplary embodiment of input device 110 that is configured as a remote control, consistent with certain disclosed embodiments. Input device 110 includes an output component 210 and a front face 220 that may include multiple buttons such as buttons 230, 240, 250 and 260, for example. A user may select one or more of buttons 230-260 in order to change settings on one or more of electronic devices 120. In response to the user's selection of a button, input device 110 may send an electronic signal to one or more of electronic devices 120 via output component 210, the signal indicating the selected setting change. The configuration, format, design, and "look and feel" of input device 110 is not limited to that shown in FIG. 2 and such features may vary consistent with disclosed embodiments.

In some embodiments output component 210 may include IR light emitting diodes (LEDs) capable of sending an IR signal via network 130 to an electronic device, such as electronic device 120a. The IR signal may be modulated, for example, to encode data, and the signal may be received by electronic device 120a. Other communications protocols and components may also be used, such as Bluetooth, IEEE 802.11, etc.

In one embodiment, input device 110 may include power buttons that may allow a user to place an electronic device into different power states. For example, input device 110 may include on button 230, standby button 240, and off button 250. In some embodiments, on button 230 and standby button 240 may be combined to a single button that toggles between the two power states when selected. A user may select on button 230 to place an electronic device into on mode, standby button 240 to place an electronic device into standby mod and off button 250 to place an electronic device into off mode. The different power modes will be discussed in greater detail below.

Buttons 260 may include various other setting options for an electronic device. The arrangement, number, and selection of buttons 260 may vary, e.g., depending on the type of electronic device(s) being controlled.

Buttons 230-260 may be any input mechanism capable of receiving a user's input. For example, in some embodiments, buttons 230-260 may be physical buttons that a user depresses to indicate a choice as shown in FIG. 2. In other embodiments, one or more buttons 230-260 may be incorporated into an electronic display, such as a touch screen, for example, and the one or more buttons 230-260 may be displayed as icons on the screen for the user to select. In certain embodiments, buttons 230-260 may incorporate both physical buttons and a touch screen. In certain embodiments, input device 110 may use voice recognition and/or gesture recognition instead of buttons in to receive inputs from the user.

Figure 3:
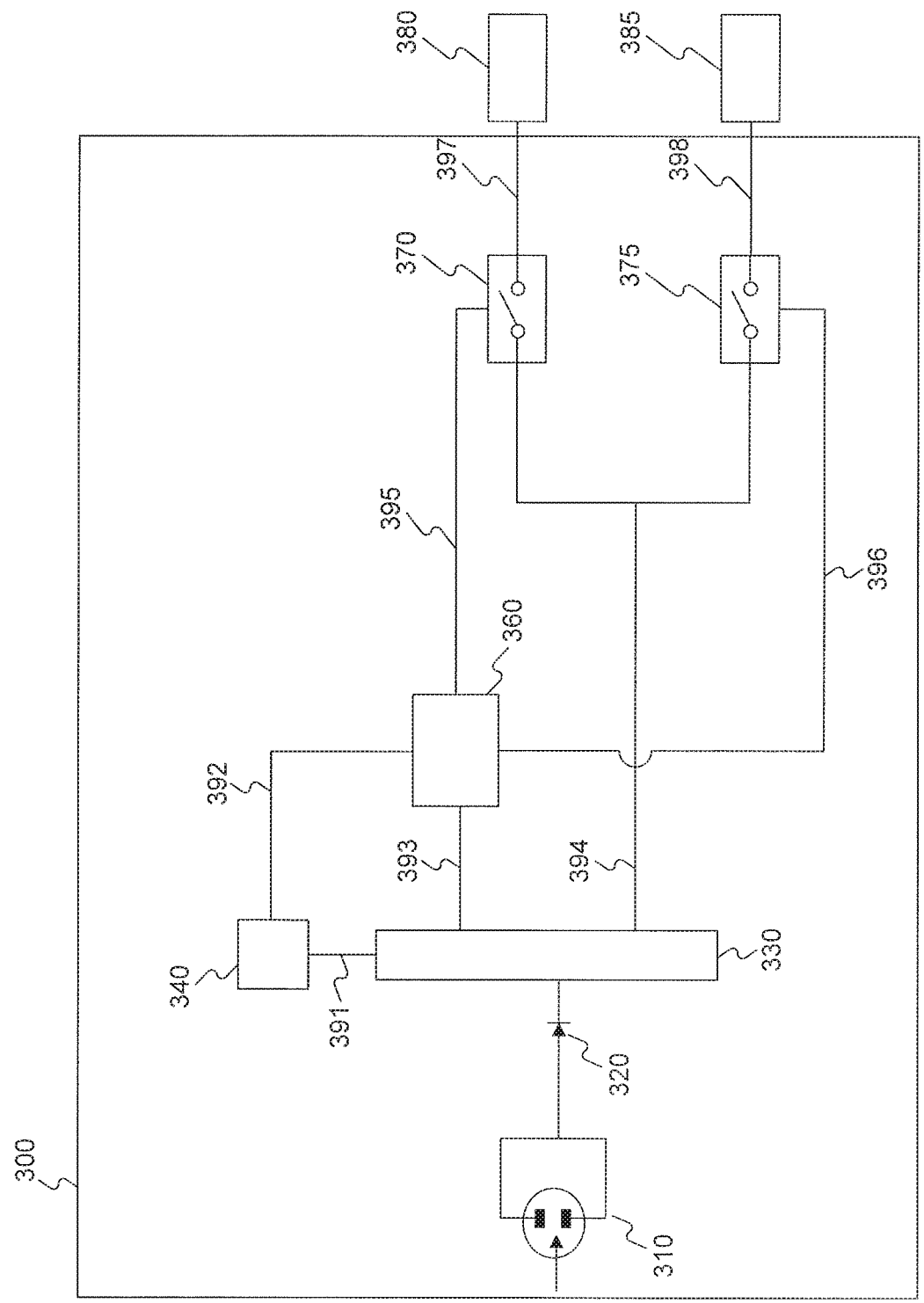
FIG. 3 is a power mode selection circuit, consistent with disclosed embodiments.

FIG. 3 is an exemplary powermode selection circuit 300, consistent with disclosed embodiments. In one embodiment, power mode selection circuit 300 includes power input 310, stabilizing diode 320, transformer 330, power mode selection receiving component 340, switching component 360, main switch 370, standby switch 375, power lines 391, 393, 394, 397, and 398, and communications lines 392, 395, and 396. These components are described in greater detail below with respect to FIG. 3.

Power mode selection circuit 300 may be included in an electronic device, such as one or more of electronic devices 120, for example, to provide power to various components in the electronic device based on a specified power setting. For example, an electronic device may include one or more main components 380 and one or more standby components 385, which are both powered by power mode selection circuit 300. The identification of electrical components as either main components 380 or standby components 385 may vary among different electronic device 120 and among different embodiments.

For example, a DVD player may include several components, such as a microprocessor, video encoder and decoder, DVD tray motor, audio systems, DVD lens reader, internet connection, RAM, flash memory, etc. In one embodiment, key electrical components, such as the microprocessor and RAM, may be main components 380 and all other components may be standby components 385.

In another embodiment, main components 380 may include one or more electronic components that can be powered off and powered on relatively quickly, while standby components 385 may include one or more electronic components that take a longer time to become operational after they are powered on. In the DVD player example, main components 380 may include the microprocessor, RAM, and a clock, and standby components 385 may include all other components.

In another embodiment, main components 380 may include certain key components and components that allow an electrical device to perform certain functionalities even in an off mode. In the DVD player example, the microprocessor, main components 380 may include RAM, clock, DVD tray motor, and components that enable network connections (e.g. the Internet), and standby components 385 may include all other components included in the DVD player. Thus, even in an off mode, a user may still be able to open and close the DVD tray and the DVD player may maintain an Internet connection.

In some embodiments, power mode selection circuit 300 may allow a user to selectively power on and power off the main components 380 and the standby components 385. However, in other embodiments, power mode selection circuit 300 may allow a user to selectively power the main components 380 and/or the standby components 385 in a lower-power consumption mode. For example, in the DVD player example discussed above, power mode selection circuit 300 may provide power to components such that a clock is fully operational, but not enough power to enable to DVD tray to open.

While not shown in FIG. 3, in some embodiments main components 380 and/or standby components 385 may be communicatively connected to a network, e.g., the Internet. Main components 380 and/or standby components 385 may obtain information via the network in order to become operational faster after being powered on. For example, main components 380 and/or standby components 385 may obtain date, time, and location information from the network. In some embodiments, main components 380 and standby components 385 may be connected to the network via a network connection that is integrated into electronic device 120 separate from power mode selection circuit 300. In other embodiments, main components 380 and standby components 385 may be connected to the network via switching component 360. In such embodiments, switching component 360 may obtain the information from the network and send the information to main components 380 and/or standby components 385 via a wired or wireless connection between switching component 360 and main components 380 and/or standby components 385.

Power mode selection circuit 300 may allow selective power control in response to user or other forms of input to power on and power off main components 380 and standby components 385 independently. In one embodiment, the selective power control may be performed via separate switches, such as main switch 370 and standby switch 375, for example. Switches 370 and 375 may each be implemented using any type of switching device such as solid state switching devices, e.g., analog switches, solid state relays, metal oxide semiconductor field effect transistors (MOSFETs), etc.

Further, while two switches 370 and 375 are shown in FIG. 3, any number of switches may be used. In some embodiments, switches 370 and 375 may be combined into a single switch, having any number of inputs and outputs. For example, in one embodiment, the switch may include two inputs that may correspond to communications lines 395 and 396 and two physical outputs with three different output modes, each output mode corresponding to one of the on, off, and standby modes. In another embodiment, an additional switch may be located on power line 394 in a location such that the additional switch is capable of blocking the power to both main components 380 and main components 385. Switching component 360 may also control this additional switch, for example. In this embodiment, when switching component 360 switches into an off mode, switching component 360 may open the switch on power line 394 in order to block power to main components 380 and standby components 385.

Power mode selection circuit 300 may include a power input 310 that draws power from a power source. For example, power input 310 may include a utility plug that connects to a standard 110/120 volt power outlet, a 12 volt power source, or any other type of external power source. The current may be stabilized by diode 320 and fed into transformer 330. Transformer 330 may convert the alternating current (AC) to direct current (DC), for example, so that it can be used by electronic devices. While one diode 320 and one transformer 330 are shown in FIG. 3, any number and different types of diodes and transformers may be used. Further, in certain embodiments, diode 320 and/or transformer 330 may not be included in power mode selection circuit 300.

Transformer 330 may output the DC current to other components of power mode selection circuit 300. For example, transformer 330 may provide power to a power mode selection receiving component 340 via power line 391, to switching component 360 via power line 393, and to main switch 370 and standby switch 375 via power line 394. In this configuration, power mode selection receiving component 340 and switching component 360 may be powered via a separate circuit than main components 380 and standby components 385. This may enable power mode selection receiving component 340 and switching component 360 to be powered independently of main components 380 and standby components 385.

Power mode selection receiving component 340 may be capable of receiving an input regarding a power mode selection for an electronic device that includes power mode selection circuit 300. For example, a user may select a specific power mode for the electronic device by selecting a power mode button (e.g. buttons 230, 240, 250) on input device 110. Input device 110 may send information via network 130 that may be received by power mode selection receiving component 340. For example, in embodiments where input device 110 sends information via IR, power mode selection receiving component 340 may include photodiodes capable of receiving the IR pulses and transforming them into electronic signals. As discussed above, in some embodiments, other communication protocols may be used, e.g., Bluetooth, IEEE 802.11, etc. In these embodiments, power mode selection receiving component 340 may include a receiver capable of receiving information from input device 110 via one or more of these protocols and transforming them into electronic signals usable by circuit 300. In other embodiments, a user may provide input to power mode selection receiving component 340 via other mechanisms, such as manually selecting buttons or the like on the electronic device, or providing input remotely via the Internet. In the latter example, power mode selection receiving component 340 may receive input from the Internet from a user remotely located from the electronic device, such as a user who is traveling and uses known Internet mechanisms to provide input via a web service or smart phone applications that provide or relay the user's selections to power mode selection receiving component 340 via Internet communication mechanisms.

Power mode selection receiving component 340 may be communicatively coupled to switching component 360 via communications line 392. Power mode selection receiving component 340 may send one or more commands to switching component 360 based on the input received, e.g., from input device 110. For example, power mode selection receiving component 340 may instruct switching component 360 to enter an on mode, an off mode, or a standby mode based on an input received from an external source such as a remote control.

In response to the input received from power mode selection receiving component 340, switching component 360 may direct main switch 370 and/or standby switch 375 to open and/or close. Switching component 360 may control main switch 370 via main control line 395 and may control standby switch 375 via standby control line 396.

For example, input device 110 may send a signal representing an on mode to power mode selection receiving component 340. Responsive to the signal, power mode selection receiving component 340 may instruct switching component 360 to place the electronic device in an on mode. In response, switching component 360 may send a first control signal to main switch 370 via main control line 395. The first control signal may direct main switch 370 to close and to provide power to main components 380 via main power line 397. Switching component 360 may also send a second control signal to standby switch 375 via standby control line 396. The second control signal may direct standby switch 375 to close and to provide power to standby components 385 via standby power line 398.

Similarly, input device 110 may send a signal representing a standby mode to power mode selection receiving component 340. Responsive to the signal, power mode selection receiving component 340 may instruct switching component 360 to place the electronic device in a standby mode. Switching component 360 may send a first control signal to main switch 370 via main control line 395. The first control signal may direct main switch 370 to open and block power to main components 380. Switching component 360 may send a second control signal to standby switch 375 via standby control line 396. The second control signal may direct standby switch 375 to close and provide power to standby components 385 via standby power line 398.

Similarly, input device 110 may send a signal representing an off mode to power mode selection receiving component 340. Responsive to the signal, power mode selection receiving component 340 may instruct switching component 360 to place the electronic device in an off mode. Switching component 360 may send a first control signal to main switch 370 via main control line 395. The first control signal may direct main switch 370 to open and block power to main components 380. Switching component 360 may send a second control signal to standby switch 375 via standby control line 396. The second control signal may direct standby switch 375 to open and block power to standby components 385. Thus, in the off mode, main components 380 and standby components 385 do not receive any power. However, because power mode selection receiving component 340 and switching component 360 are powered by circuits separate from that powering main components 380 and standby components 385, power mode selection receiving component 340 and switching component 360 may still draw power.

Power mode selection receiving component 340 and switching component 360 are shown in FIG. 3 as separate components. However, in some embodiments, they may be incorporated in a single component. Further, switching component 360 may include any type of hardware and/or software capable of receiving an input regarding a power mode and controlling the power provided to various components based on that input. In some embodiments, switching component 360 may include hardwired circuitry, such as application-specific integrated circuits (ASICs). In other embodiments, switching component 360 may include a memory storing software that stores instructions executed by a processor.

Figure 4:
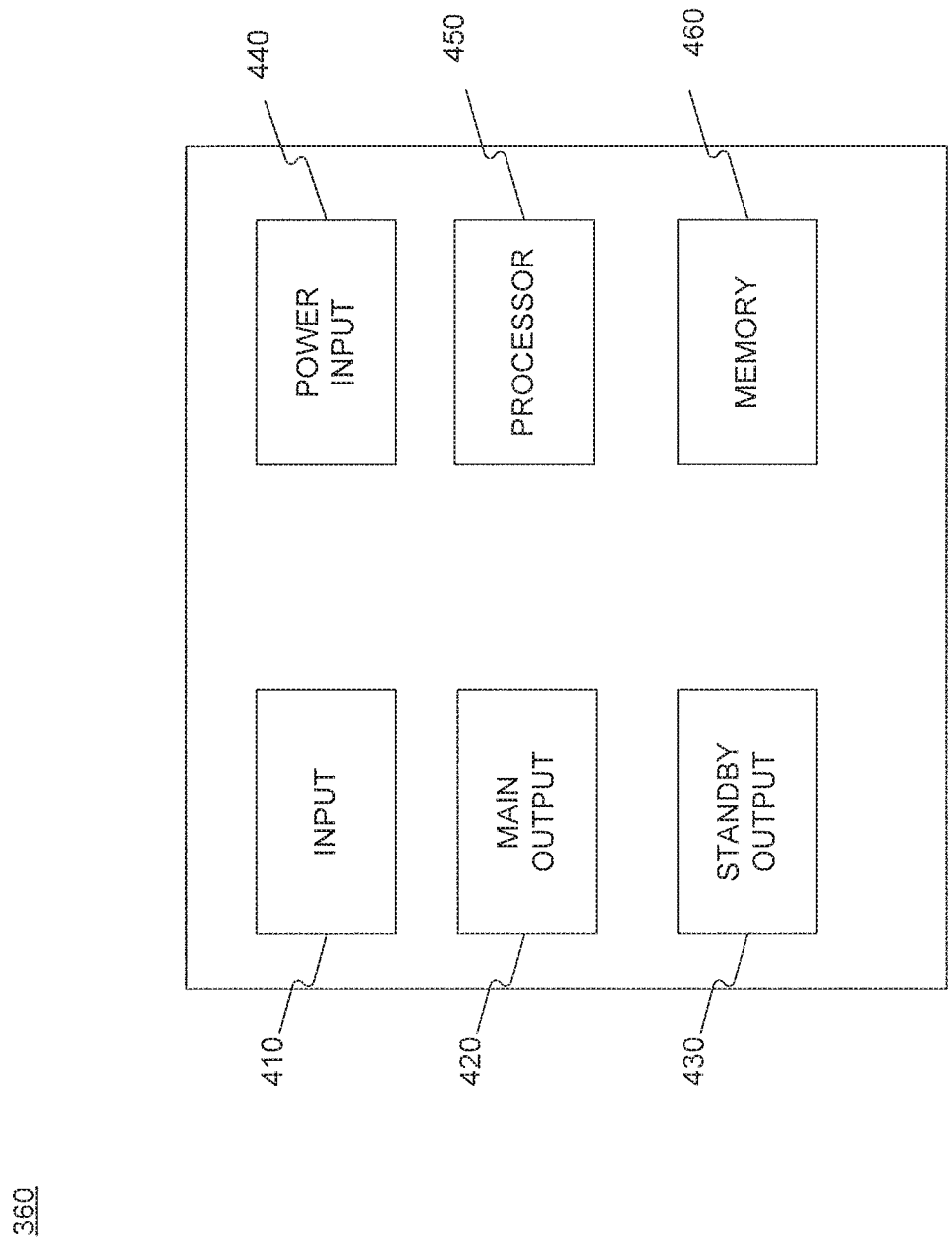
FIG. 4 is an exemplary block diagram of a switching component, consistent with disclosed embodiments.

As discussed above, switching component 360 may be implemented using various technologies. FIG. 4 is an exemplary block diagram of one embodiment of a switching component 360 that may include processing and memory capabilities, consistent with disclosed embodiments. As shown, switching component 360 may include input 410, main output 420, standby output 430, power input 440, processor 450, and memory 460. Input 410 may be any input component capable of receiving a control signal indicating a power mode. For example, input 410 may receive a control signal from power mode selection receiving component 340, In some embodiments, power mode selection receiving component 340 and switching component 360 may be combined in a single component, and input 410 may receive a control signal from input device 110 via network 130, for example. In embodiments where input device 110 is a remote control, input 410 may include photodiodes to receive input from the remote control.

Main output 420 may be any output component capable of sending a control signal to control the power provided to one or more main components in an electronic device. For example, processor 450 may control the status of main switch 370 by directing main output 420 to send a control signal via main control line 395. Similarly, standby output 430 may be any output component capable of sending a control signal to control the power to one or more standby components in an electronic device. For example, processor 450 may control the status of standby switch 375 by directing standby output 430 to send a control signal via standby control line 396.

Power input 440 may receive power for switching component 360. For example, power input 440 may receive power via a circuit that is separate from the circuit powering main components 380 and standby components 385, so that switching component 360 may be powered independently of the main components 380 and standby components 385.

Processor 450 may be one or more known processing devices, such as a microprocessor from the Pentium™ or Xeon™ family manufactured by Intel™, the Turion™ family manufactured by AMD™, or any other type of processor. Memory 460 may be one or more tangible storage devices configured to store information used by processor 450 to perform certain functions related to disclosed embodiments. In some embodiments, memory 460 may include one or more power mode selection programs that, when executed by processor 450 of switching component 360, perform various procedures, operations, or processes consistent with disclosed embodiments.

In one embodiment, memory 460 may also store information used by processor 450 to select various power modes for different electronic devices. For example, memory 460 may include information regarding power-on events to deters pine whether it is appropriate to place an electronic device into an off mode or a standby mode. A power-on event may be a time in the future that the electronic device must be powered on, is scheduled to be powered on, etc. For example, in embodiments where the electronic device is a DVR, memory 460 may store information regarding scheduled DVR recordings. If a user attempts to turn the electronic device completely off, switching component 360 may instead turn the electronic device into a standby mode, so that the recordings can be made as scheduled. Further, in some embodiments, memory 460 may store information regarding scheduled DVR recordings, and processor 450, executing programs stored in memory 460, may generate commands that automatically switch a DVR from off mode to standby mode based on the scheduled recordings.

In the embodiments discussed above, memory 460 may store the entire DVR recording schedule or may store a subset of information related to the DVR recording schedule. For example, the DVR may include a separate memory, which may be included in main components 380 or standby components 385, for example, that stores the DVR recording schedule. In some embodiments, switching component 360 may obtain information related to the DVR recording schedule from the separate memory. For example, instead of obtaining the entire schedule, switching component may obtain the next power-on event, the next two power-on events, or any number of the next power-on events. This information may be obtained at any time, such as before switching component 360 sends commands to block power to main components 380 and/or standby components 385 or every time there is a power mode change. For example, switching component 360 may receive a control signal from power mode selection receiving component, e.g., indicating a command to change from one power mode to another. Responsive to receiving the control signal with the command, switching component 360 may obtain information related to the DVR recording schedule (e.g., one or more of the next power-on events), e.g., by making a query for this information to the DVR's memory or to any other device such as a database storing the DVR recording schedule located remotely from the DVR via a network such as the Internet. The information related to the DVR recording schedule may then be stored in memory 460. As discussed above, this information may be used to determine whether switching component 360 should enter a standby mode instead of an off mode and whether to automatically switch the device from an off mode to an on mode.

Memory 460 may also store information used to help components, such as standby components 385, become operational more quickly after transitioning from an off mode to an on mode. For example, memory 460 may include information such as date, time, and location and may provide this information to the standby components 385 as they transition from an off mode.

Figure 5:
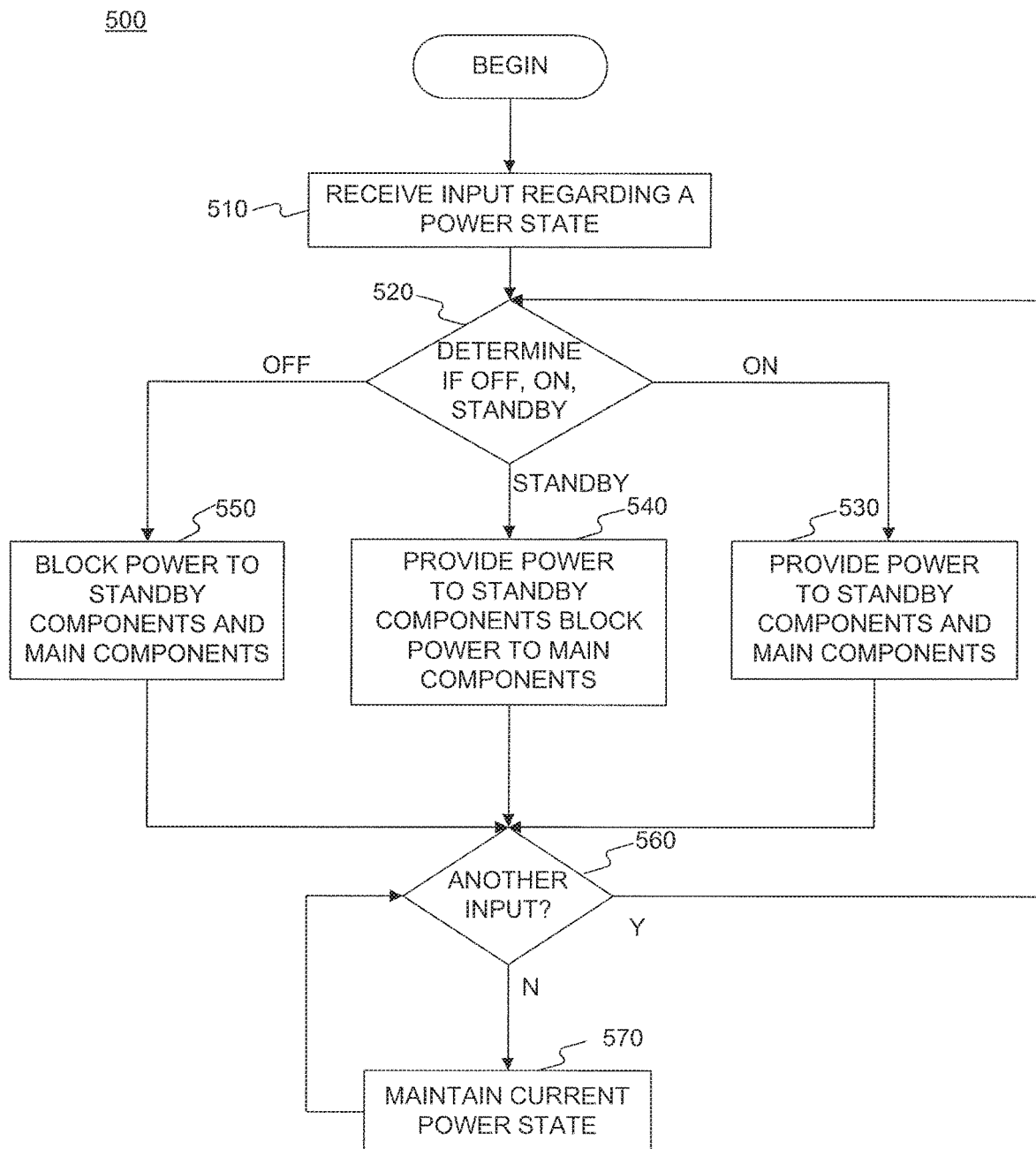
FIG. 5 is an exemplary power mode selection process, consistent with disclosed embodiments.

FIG. 5 shows an exemplary power mode selection process 500, consistent with disclosed embodiments. In one embodiment, process 500 may be performed by, e.g., power mode selection circuit 300. The process may begin at step 510 where power mode selection receiving component 340 receives an input regarding a power state. For example, power mode selection receiving component 340 may receive an input from input device 110 via network 130. Power mode selection receiving component 340 may send a command based on the input to switching component 360, for example. However, as discussed, power mode selection receiving component 340 and switching component 360 may also be a single component.

At step 520, switching component 360 determines whether the received input indicates an off, on, or standby mode. If the input indicates an on mode, switching component 360 may provide power to main components 380 and standby components 385 as shown in step 530. For example, switching component 360 may send a first control signal to main switch 370 via main control line 395. The first control signal may direct main switch 370 to close and to provide power to main components 380 via main power line 397. Switching component 360 may also send a second control signal to standby switch 375 via standby control line 396. The second control signal may direct standby switch 375 to close and to provide power to standby components 385 via standby power line 398.

If, at step 520, switching component 360 determines that the input indicates a standby mode, switching component 360 may provide power to standby components 385 but may block power to main components 380 as shown in step 540. For example, switching component 360 may send a first control signal to main switch 370 via main control line 395. The first control signal may direct main switch 370 to open and block power to main components 380. Switching component 360 may send a second control signal to standby switch 375 via standby control line 396. The second control signal may direct standby switch 375 to close and provide power to standby components 385 via standby power line 398.

If, at step 520, switching component 360 determines that the input indicates an off mode, switching component 360 may block power to both main components 380 and standby components 385 as shown in step 550. For example, switching component 360 may send a first control signal to main switch 370 via main control line 395. The first control signal may direct main switch 370 to open and block power to main components 380, Switching component 360 may send a second control signal to standby switch 375 via standby control line 396. The second control signal may direct standby switch 375 to open and block power to standby components 385. Thus, in the off mode, main components 380 the standby components 385 do not receive any power. However, because power mode selection receiving component 340 and switching component 360 are powered by circuits separate from the circuit powering the main and standby components, power mode selection receiving component 340 and switching component 360 may still draw power.

At step 560, switching component 360 and/or power mode selection receiving component 340 may determine if another input has been received. If switching component 360 and/or power mode selection receiving component 340 have not received another input, switching component 360 maintains the current power state, as shown in step 570. If, at step 560, switching component 360 and/or power mode selection receiving component 340 receive another input, the process may return to step 520 where switching component 360 again determines which power mode has been selected.

Figure 6:
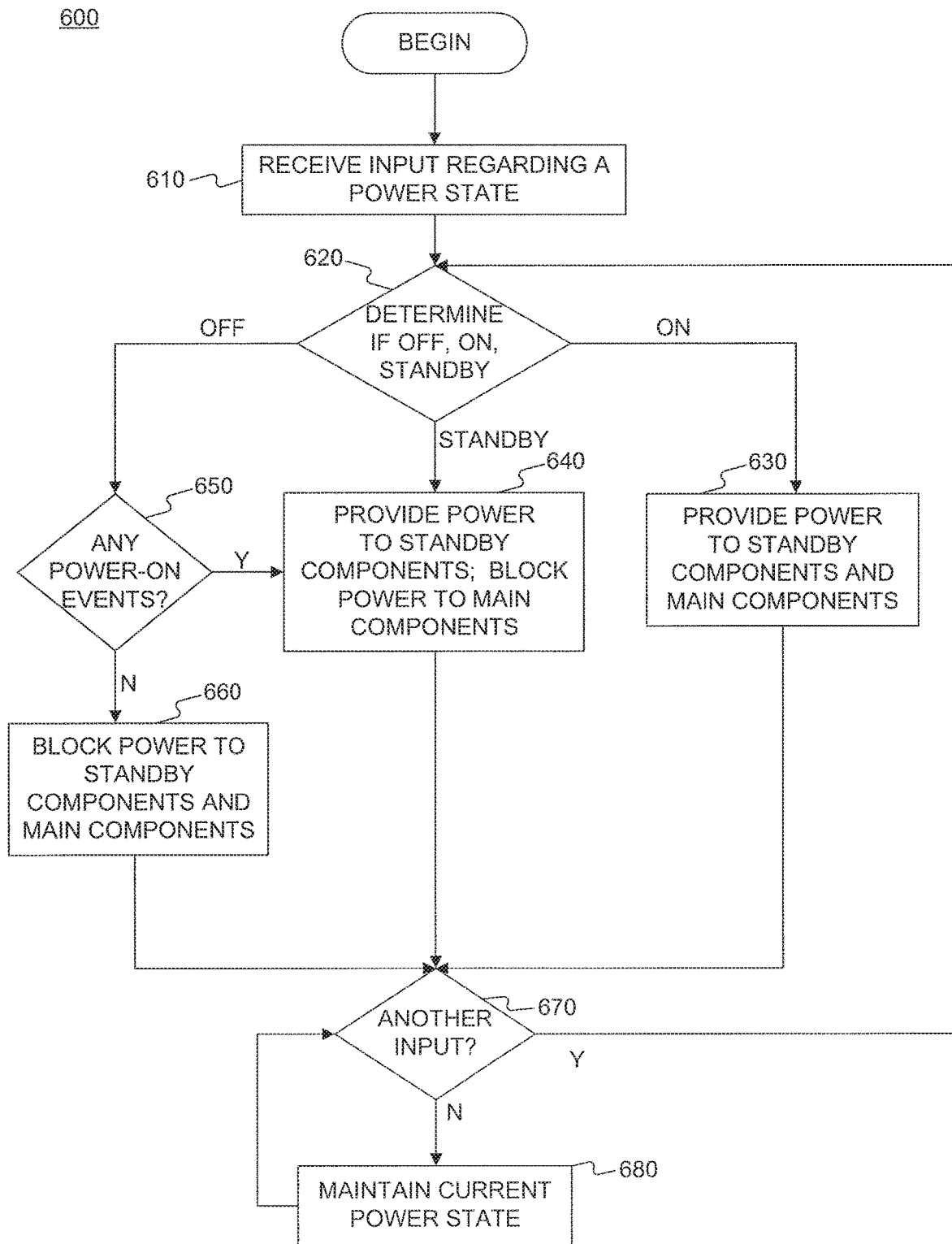
FIG. 6 is another exemplary power mode selection process, consistent with disclosed embodiments.

FIG. 6 shows another exemplary power anode selection process 600, consistent with disclosed embodiments. In one embodiment, process 600 may be performed by exemplary embodiments of switching component 360, such as the exemplary embodiment disclosed in FIG. 4 where switching component 360 includes processor 450 and memory 460. For example, software stored in memory 460 may include instructions that, when executed by processor 450, cause processor 450 to perform one or more of the steps in process 600.

Process 600 may begin at step 610 where processor 450 receives an input regarding a power state via input 410. For example, processor 450 may receive an input from power mode selection receiving component 340 via input 410. In embodiments where power mode selection receiving component 340 and switching component 360 are a single component, processor 450, via input 410, may receive an input from input device 110 over network 130.

At step 620 processor 450 determines if the input received through input 410 indicates an off, on, or standby mode. If the input indicates an on mode, processor 450 may control the outputs at main output 420 and standby output 430 to provide power to main components 380 and standby components 385, as shown in step 630. For example, processor 450 may direct main output 420 to send a first control signal to main switch 370 via main control line 395. The first control signal may direct main switch 370 to close and provide power to main components 380 via main power line 397. Processor 450 may also direct standby output 430 to send a second control signal to standby switch 375 via standby control line 396. The second control signal may direct standby switch 375 to close and provide power to standby components 385 via standby power line 398.

If, at step 620, processor 450 determines that the input received through input 410 indicates a standby mode, processor 450 may control the outputs at main output 420 and standby output 430 to provide power to standby components 385 but block power to main components 380, as shown in step 640. For example, processor 450 may direct main output 420 to send a first control signal to main switch 370 via main control line 395. The first control signal may direct main switch 370 to open and block power to main components 380. Processor 450 may also direct standby output 430 to send a second control signal to standby switch 375 via standby control line 396. The second control signal may direct standby switch 375 to close and provide power to standby components 385 via standby power line 398.

If, at step 620, processor 450 determines that the input received through input 410 indicates an off mode, processor 450 may determine whether there are any power-on events, as shown in step 650. For example, as discussed above, if processor 450 is part of a power mode selection circuit in a DVR, processor 450 may query the DVR's memory to determine whether there is a scheduled recording in the future. If, at step 650, the processor determines that there is a power-on event, the process proceeds to step 640, where processor 450 controls the outputs at main output 420 and standby output 430 to provide power to standby components 385 but block power to main components 380. Thus, processor 450 returns to a standby mode, as described above with regard to step 640.

If, at step 650, processor 450 determines that there are no power-on events, processor 450 controls the outputs at main output 420 and standby output 430 to block power to both main components 380 and standby components 385 as shown in step 660. For example, processor 450 may direct main output 420 to send a first control signal to main switch 370 via main control line 395. The first control signal may direct main switch 370 to open and block power to main components 380. Processor 450 may also direct standby output 430 to send a second control signal to standby switch 375 via standby control line 396. The second control signal may direct standby switch 375 to open and block power to standby components 385.

At step 670, processor 450 determines whether another input has been received at input 410. If processor 450 has not received another input via input 410, processor 450 maintains the current power state, as shown in step 680. However, if input 410 has received another input, processor 450 returns to step 620, where processor 450 determines whether the input indicates an off, on, or standby mode, and the process, discussed above, repeats.

Process 600 is an exemplary process and may be varied consistent with disclosed embodiments. For example, at step 650 of process 600, if processor 450 determines that there are power-on events, processor 450 proceeds to standby mode as shown in step 640. However, in one embodiment, processor 450 may store the next power-on event in memory 460. In this embodiment, processor 450, in response to an input indicating an off mode, may control main output 420 and standby output 430 in accordance with an off mode, discussed above with regard to step 660. Processor 450 may stay in off mode until either receiving another input or until determining that the time of the power-on event occurs. If input 410 receives another input, processor 450 may determine whether the input indicates an on, off, or standby mode, as discussed with regard to step 420. However, if the time of the power on event occurs before input 410 receives another input, processor 450 may automatically proceed to an on mode, controlling main output 420 and standby output 430 as discussed above with regard to step 630.

Other embodiments will be apparent to those skilled in the art from consideration of the specification and practice of embodiments disclosed herein. It is intended that the specification and examples be considered as exemplary only, with a true scope and spirit of the disclosed embodiments being indicated by the following claims. For example, any type of electronic device including the components disclosed herein consistent with the described embodiments may be used.

What is claimed is:

1. An electronic device comprising:
   power supply circuitry to connect to an external alternating current (AC) power supply and to generate therefrom direct current (DC) power;
   processing circuitry to provide at least one of audio or video information for output by the electronic device, in a power-on mode, dependent on the DC power, wherein processing circuitry comprises first circuitry and second circuitry;
   power control circuitry to selectively depower the first circuitry in a power-off mode as well as in a low-power mode, and to selectively depower the second circuitry in the power-off mode but not the low-power mode; and
   receiver circuitry to receive an external input;
   wherein the electronic device is to transition from a first one of the power-on mode, the low-power mode and the power-off mode, to a second one of the power-on mode, the low-power mode and the power-off mode, in response to receipt of the external input.

2. The electronic device of claim 1, embodied as a digital video recorder, wherein the second circuitry comprises a decoder to decode externally-supplied digital video information during the low-power mode, to obtain video content, and electronic memory, in which to store the obtained video content, and wherein the first circuitry is to output the obtained video content as an electronic signal during the power-on mode.

3. The electronic device of claim 1, embodied as a television, wherein the second circuitry comprises a decoder to decode externally-supplied video information during the power-on mode and wherein the first circuitry comprises an electronic display screen to display images during the power-on mode, the images being dependent on the decoded information.

4. The electronic device of claim 1, embodied as a video disk player, wherein the electronic device comprises a tray having an open position and a closed position, wherein the tray is to receive a disk when the tray is in the open position, wherein the first circuitry is to play the disk when the tray is in the closed position, during the power-on mode, and wherein the second circuitry is to control movement of the tray between the open position and the closed position during the low power mode.

5. The electronic device of claim 1 wherein the power control circuitry comprises a power metal oxide field effect transistor (MOSFET), and is to control the power MOSFET to selectively empower to the second circuitry.

6. The electronic device of claim 5 wherein the power MOSFET is a first power MOSFET, wherein the power control circuitry comprises a second MOSFET, and wherein the power control circuitry is to control the second power MOSFET to selectively depower to the first circuitry.

7. The electronic device of claim 1 wherein the receiver circuitry is to wirelessly receive the external input from a handheld remote control.

8. The electronic device of claim 1 wherein the receiver circuitry comprises a wide area network (WAN) receiver configurable to receive the external input via the Internet.

9. The electronic device of claim 1, embodied as a digital video recorder, wherein the second circuitry is to record externally-supplied audiovisual information during the low-power mode and wherein the first circuitry is to output the recorded audiovisual information as an electronic signal during the power-on mode.

10. The electronic device of claim 9 wherein the electronic device comprises electronic memory to store scheduling information for video program recording, and wherein the power control circuitry is to selectively empower the second circuitry in association with the low power mode, in a manner dependent on the stored scheduling information.

11. A method of operation in an electronic device having power supply circuitry, processing circuitry, power control circuitry and receiver circuitry, the method comprising:
   receiving power from an external alternating current (AC) power supply and generating therefrom direct current (DC) power;
   with the processing circuitry, providing at least one of audio or video information for output by the electronic device, in a power-on mode, dependent on the DC power, wherein processing circuitry comprises first circuitry and second circuitry;
   controlling the power control circuitry so as to selectively depower each of the first circuitry and the second circuitry; and
   receiving an external input with the receiver circuitry;
   wherein the method further comprises causing the electronic device to transition from a first one of the power-on mode, the low-power mode and the power-off mode, to a second one of the power-on mode, the low-power mode and the power-off mode, in response to the receiving of the external input.

12. The method of claim 11, wherein the electronic device is embodied as a digital video recorder and wherein the second circuitry comprises a decoder and electronic memory, and wherein the method further comprises:
   during the low-power mode, causing the decoder to decode externally-supplied digital video information during the low-power mode, to obtain video content, and to store the obtained video content in the electronic memory; and
   during the power-on mode, causing the first circuitry to output the obtained video content as an electronic output signal.

13. The method of claim 11, wherein the electronic device is embodied as a television, wherein the first circuitry comprises an electronic display screen, wherein the second circuitry comprises a decoder, and wherein the method further comprises:
   causing the decoder to decode externally-supplied video information during the power-on mode; and
   causing the electronic display screen to display images dependent on the decoded information during the power-on mode.

14. The method of claim 11, wherein the electronic device is embodied as a video disk player and comprises a tray having an open position and a closed position, wherein the tray is to receive a disk when the tray is the open position, and wherein the method further comprises:
   causing the first circuitry to play the disk when the tray is in a closed position during the power-on mode; and
   causing the second circuitry to control movement of the tray between the open position and the closed position during the low power mode.

15. The method of claim 11 wherein the power control circuitry comprises a power metal oxide field effect transistor (MOSFET), and wherein the method further comprises causing the power MOSFET to selectively empower to the second circuitry.

16. The method of claim 15 wherein the power MOSFET is a first power MOSFET, wherein the power control circuitry comprises a second MOSFET, and wherein the method further comprises causing the second power MOSFET to selectively depower to the first circuitry.

17. The method of claim 11 wherein the receiver circuitry comprises a wireless receiver, and wherein the method further comprises causing the wireless receiver to receive the external input from a handheld remote control.

18. The method of claim 11 wherein the receiver circuitry comprises a wide area network (WAN) receiver, and wherein the method further comprises causing he WAN receiver to receive the external input via the Internet.

19. The method of claim 11, wherein the electronic device is embodied as a digital video recorder and wherein the method further comprises:
   causing the second circuitry to record externally-supplied audiovisual information during the low-power mode; and
   causing the first circuitry to output the recorded audiovisual information as an audio visual electronic signal during the power-on mode.

20. The method of claim 19 wherein the electronic device comprises electronic memory to store scheduling information for video program recording, and wherein the method further comprises, with the power control circuitry, selectively empowering the second circuitry in association with the low power mode, in a manner dependent on the stored scheduling information.

* * * * *